US011938596B1

(12) United States Patent
Vandenberg et al.

(10) Patent No.: US 11,938,596 B1
(45) Date of Patent: Mar. 26, 2024

(54) FASTENER INSTALLATION TOOL AND RELATED METHOD OF USE

(71) Applicant: National Nail Corp., Grand Rapids, MI (US)

(72) Inventors: Roger A. Vandenberg, Hudsonville, MI (US); Todd E. A. Schwartzkopf, Hudsonville, MI (US); Christopher M. Colyn, Grandville, MI (US)

(73) Assignee: National Nail Corp., Grand Rapids, MI (US)

( * ) Notice: Subject to any disclaimer, the term of this patent is extended or adjusted under 35 U.S.C. 154(b) by 0 days.

(21) Appl. No.: 18/101,901

(22) Filed: Jan. 26, 2023

(51) Int. Cl.
*B25B 23/00* (2006.01)
*E04F 21/22* (2006.01)
*B25B 21/00* (2006.01)

(52) U.S. Cl.
CPC ............ *B25B 23/005* (2013.01); *E04F 21/22* (2013.01); *B25B 21/00* (2013.01)

(58) Field of Classification Search
CPC ......... B25B 23/005; B25B 21/00; E04F 21/22
See application file for complete search history.

(56) References Cited

U.S. PATENT DOCUMENTS

| | | | |
|---|---|---|---|
| 126,366 | A | 4/1872 | Wills |
| 137,414 | A | 4/1873 | Burdick |
| 138,784 | A | 5/1873 | Bourn |
| 411,202 | A | 9/1889 | Rose |
| 877,831 | A | 1/1908 | Creedon |
| 984,323 | A | 2/1911 | Vauclain |
| 1,016,383 | A | 2/1912 | Wellman |
| 1,074,800 | A | 10/1913 | King |
| 2,774,969 | A | 12/1956 | Samples |
| 2,878,845 | A | 3/1959 | Hale |
| 2,994,878 | A | 8/1961 | Abrahamsen |

(Continued)

FOREIGN PATENT DOCUMENTS

| | | |
|---|---|---|
| CA | 1242601 | 10/1988 |
| CH | 695482 | 6/2006 |

(Continued)

OTHER PUBLICATIONS

Fastening Deck Boards by Kim Katwijk and Linda Katwijk; Sep. 1, 2009; Professional Deck Builder; Sep.-Oct. 2009; pp. 1-6.

(Continued)

*Primary Examiner* — Ryan J. Walters
(74) *Attorney, Agent, or Firm* — Warner Norcross + Judd LLP

(57) ABSTRACT

A fastener installation tool is provided with a first fastener guide that guides a fastener into a side of a workpiece at an angle, and includes a pusher block that can be used to urge the workpiece toward an adjacent workpiece. The tool can include a second fastener guide having a spacer with a spacer width that establishes a consistent, predetermined gap between the adjacent workpieces. The pusher block can be strengthened via a pusher block width that is greater than the spacer width to withstand forces when the pusher block urges one workpiece toward another. The guide can be selectively moveable in a guide tube and able to be clamped in a selected location therein to set the spacer a predetermined distance from the pusher block to accommodate a variety of board sizes. Related methods of use also are provided.

20 Claims, 9 Drawing Sheets

(56) References Cited

U.S. PATENT DOCUMENTS

| | | | |
|---|---|---|---|
| 3,010,496 | A | 11/1961 | Bruce |
| 3,012,247 | A | 12/1961 | Sillars et al. |
| 3,147,484 | A | 9/1964 | Nelson |
| 3,177,755 | A | 4/1965 | Kahn |
| 3,207,023 | A | 9/1965 | Knohl |
| 3,288,015 | A | 11/1966 | Hanneman |
| 3,316,949 | A | 5/1967 | Canfield |
| 3,357,295 | A | 12/1967 | Smith |
| 3,360,176 | A | 12/1967 | Gehl et al. |
| 3,395,603 | A | 8/1968 | Skierski |
| 3,738,218 | A | 6/1973 | Gutshall |
| 3,942,405 | A | 3/1976 | Wagner |
| 4,018,254 | A | 4/1977 | DeCaro |
| 4,068,554 | A | 1/1978 | Hirabayashi |
| 4,123,186 | A | 10/1978 | Hoadley |
| 4,146,071 | A | 3/1979 | Mueller et al. |
| 4,209,275 | A | 6/1980 | Kim |
| 4,241,638 | A | 12/1980 | Shimizu et al. |
| 4,323,326 | A | 4/1982 | Okada et al. |
| 4,329,099 | A | 5/1982 | Shimizu et al. |
| 4,439,077 | A | 3/1984 | Godsted |
| 4,475,726 | A | 10/1984 | Smith |
| 4,572,720 | A | 2/1986 | Rockenfeller et al. |
| 4,586,862 | A | 5/1986 | Yamasaki |
| 4,625,597 | A | 12/1986 | Cast |
| 4,653,244 | A | 3/1987 | Farrell |
| 4,834,602 | A | 5/1989 | Takasaki |
| 4,930,225 | A | 6/1990 | Phillips |
| 5,015,134 | A | 5/1991 | Gotoh |
| 5,083,483 | A | 1/1992 | Takagi |
| 5,188,496 | A | 2/1993 | Giannuzzi |
| 5,282,708 | A | 2/1994 | Giannuzzi |
| 5,302,205 | A | 4/1994 | Priddy |
| 5,322,396 | A | 6/1994 | Blacker |
| 5,337,635 | A | 8/1994 | Habermehl |
| 5,341,706 | A | 8/1994 | Takagi |
| 5,351,586 | A | 10/1994 | Habermehl et al. |
| 5,452,630 | A | 9/1995 | Haas et al. |
| 5,469,767 | A | 11/1995 | Habermehl |
| 5,531,142 | A | 7/1996 | Adamo |
| 5,531,143 | A | 7/1996 | Habermehl et al. |
| 5,568,753 | A | 10/1996 | Habermehl et al. |
| 5,570,618 | A | 11/1996 | Habermehl et al. |
| 5,687,624 | A | 11/1997 | Tsuge et al. |
| D391,135 | S | 2/1998 | Habermehl et al. |
| 5,839,332 | A | 11/1998 | Fujiyama et al. |
| 5,871,486 | A | 2/1999 | Huebner et al. |
| 5,884,541 | A | 3/1999 | Habermehl et al. |
| 5,904,079 | A | 5/1999 | Tsuge et al. |
| 5,918,512 | A | 7/1999 | Habermehl et al. |
| 5,927,163 | A | 7/1999 | Habermehl et al. |
| 5,934,162 | A | 8/1999 | Habermehl |
| 5,988,025 | A | 11/1999 | Sasaki et al. |
| 6,027,004 | A | 2/2000 | Ramella et al. |
| 6,089,132 | A | 7/2000 | Habermehl |
| 6,098,442 | A | 8/2000 | Walldorf et al. |
| 6,109,144 | A | 8/2000 | Muro |
| 6,109,146 | A | 8/2000 | Muro |
| 6,131,434 | A | 10/2000 | Schneider, Jr. |
| 6,158,939 | A | 12/2000 | Grossberndt et al. |
| 6,244,140 | B1 | 6/2001 | Habermehl |
| 6,296,433 | B1 | 10/2001 | Forsell et al. |
| 6,322,307 | B1 | 11/2001 | Glover |
| 6,328,516 | B1 | 12/2001 | Hettich |
| 6,332,741 | B1 | 12/2001 | Janusz |
| 6,345,940 | B2 | 2/2002 | Anjanappa et al. |
| 6,394,712 | B1 | 5/2002 | Weinstein et al. |
| 6,425,306 | B1 | 7/2002 | Habermehl |
| 6,439,085 | B1 | 8/2002 | Habermehl |
| 6,453,780 | B2 | 9/2002 | Habermehl |
| 6,481,937 | B1 | 11/2002 | Sommerfeld et al. |
| 6,514,026 | B1 | 2/2003 | Gerhard |
| 6,592,015 | B1 | 7/2003 | Gostylla et al. |
| 6,601,480 | B1 | 8/2003 | Habermehl |
| 6,604,901 | B1 | 8/2003 | Grossberndt et al. |
| 6,623,228 | B1 | 9/2003 | Hettich et al. |
| 6,666,638 | B2 | 12/2003 | Craven |
| 6,769,332 | B2 | 8/2004 | Muro |
| 6,843,402 | B2 | 1/2005 | Sims et al. |
| 6,915,724 | B2 | 7/2005 | Kigel et al. |
| 6,941,635 | B2 | 9/2005 | Craven |
| 6,941,847 | B2 | 9/2005 | Habermehl et al. |
| 7,021,010 | B2 | 4/2006 | Smith et al. |
| 7,037,059 | B2 | 5/2006 | Dicke |
| 7,044,460 | B2 | 5/2006 | Bolton |
| 7,066,278 | B2 | 6/2006 | Shotey |
| 7,156,600 | B2 | 1/2007 | Panasik et al. |
| 7,165,481 | B2 | 1/2007 | Kikuchi |
| 7,231,854 | B2 | 6/2007 | Kikuchi |
| 7,344,057 | B2 | 3/2008 | Dion et al. |
| 7,424,840 | B1 | 9/2008 | Huang |
| 7,454,996 | B2 | 11/2008 | Hsu |
| 7,487,699 | B2 | 2/2009 | Xu |
| 7,682,119 | B2 | 3/2010 | Chen |
| 7,695,228 | B2 | 4/2010 | Craven |
| D614,942 | S | 5/2010 | Gaudron |
| 7,866,236 | B2 | 1/2011 | Hsu |
| RE42,207 | E | 3/2011 | Janusz |
| D637,071 | S | 5/2011 | Gaudron et al. |
| 7,950,312 | B2 | 5/2011 | Matthiesen et al. |
| 7,992,469 | B2 | 8/2011 | Chang et al. |
| 8,162,196 | B2 | 4/2012 | Gasser et al. |
| 8,192,124 | B2 | 6/2012 | Wolpert et al. |
| D662,808 | S | 7/2012 | Vandenberg |
| 8,261,507 | B2 | 9/2012 | Hahn et al. |
| D677,147 | S | 3/2013 | Vandenberg |
| 8,540,755 | B2 | 9/2013 | Whitmore |
| 8,955,210 | B2 * | 2/2015 | Vandenberg ............ B25B 23/00 173/1 |
| 9,120,214 | B2 * | 9/2015 | Vandenberg ........ F16B 25/0015 |
| 9,144,896 | B2 * | 9/2015 | Vandenberg ............ F16B 25/00 |
| 9,802,300 | B2 * | 10/2017 | Vandenberg .......... B25B 21/002 |
| 10,307,898 | B2 * | 6/2019 | Lin ........................... B25B 5/02 |
| 10,322,499 | B2 * | 6/2019 | Mikkelsen ............ B25B 23/005 |
| 10,427,279 | B2 * | 10/2019 | Rensburg .................. B25B 5/06 |
| 2003/0235483 | A1 | 12/2003 | Chen |
| 2004/0141827 | A1 | 7/2004 | Dicke |
| 2004/0144056 | A1 | 7/2004 | Morton et al. |
| 2005/0247751 | A1 | 11/2005 | Wywialowski et al. |
| 2005/0265806 | A1 | 12/2005 | Craven |
| 2005/0278934 | A1 | 12/2005 | Orchard |
| 2006/0196682 | A1 | 9/2006 | McGee et al. |
| 2007/0079978 | A1 | 4/2007 | Miller et al. |
| 2007/0128001 | A1 | 6/2007 | Su |
| 2007/0175176 | A1 | 8/2007 | Lane |
| 2007/0217887 | A1 | 9/2007 | Lin |
| 2007/0261350 | A1 | 11/2007 | Hahn et al. |
| 2008/0025816 | A1 | 1/2008 | Chen et al. |
| 2008/0080951 | A1 | 4/2008 | Lin |
| 2008/0168735 | A1 | 7/2008 | Guevremont |
| 2008/0264218 | A1 | 10/2008 | Wang et al. |
| 2008/0276761 | A1 | 11/2008 | Hale et al. |
| 2008/0296341 | A1 | 12/2008 | Francescon |
| 2009/0142159 | A1 | 6/2009 | Wolpert et al. |
| 2009/0314143 | A1 | 12/2009 | Chen |
| 2010/0083610 | A1 | 4/2010 | King |
| 2010/0181362 | A1 | 7/2010 | Martel et al. |
| 2011/0108601 | A1 | 5/2011 | Clark et al. |
| 2011/0167757 | A1 | 7/2011 | Vandenberg |
| 2011/0170984 | A1 | 7/2011 | Vandenberg |
| 2011/0214377 | A1 | 9/2011 | Tucker, Jr. |
| 2011/0232430 | A1 | 9/2011 | Hale |
| 2011/0303725 | A1 | 12/2011 | Schaer et al. |
| 2012/0000327 | A1 | 1/2012 | Park |
| 2012/0048909 | A1 | 3/2012 | Gensmann et al. |
| 2012/0073410 | A1 | 3/2012 | Hoffman et al. |
| 2012/0204409 | A1 | 8/2012 | Vandenberg |
| 2013/0051955 | A1 | 2/2013 | Su et al. |
| 2013/0174498 | A1 | 7/2013 | Hovren |
| 2013/0276589 | A1 | 10/2013 | Vandenberg |
| 2013/0276591 | A1 | 10/2013 | Vandenberg |
| 2014/0033508 | A1 | 2/2014 | Haug et al. |
| 2014/0137509 | A1 | 5/2014 | Vandenberg |
| 2014/0224072 | A1 | 8/2014 | Osborn |

(56) References Cited

U.S. PATENT DOCUMENTS

| | | | |
|---|---|---|---|
| 2014/0260814 | A1 | 9/2014 | Bullard |
| 2014/0304973 | A1 | 10/2014 | Guthrie et al. |
| 2015/0321325 | A1 | 11/2015 | Vandenberg |
| 2016/0221164 | A1 | 8/2016 | Walters et al. |
| 2017/0021479 | A1 | 1/2017 | Orchard et al. |
| 2017/0037893 | A9 | 2/2017 | Walters et al. |
| 2017/0114536 | A1 | 4/2017 | Tebo |

FOREIGN PATENT DOCUMENTS

| | | |
|---|---|---|
| DE | 4228727 | 3/1994 |
| DE | 4331689 | 3/1994 |
| EP | 1595627 | 11/2005 |
| EP | 1920890 | 5/2008 |
| EP | 1932623 | 6/2008 |
| EP | 1938928 | 7/2008 |
| EP | 2258518 | 12/2010 |
| EP | 2397706 | 12/2011 |
| GB | 191001226 | 12/1910 |
| GB | 167620 | 8/1921 |
| GB | 1009630 | 11/1965 |
| GB | 2127927 | 4/1984 |
| JP | 10329049 | 12/1998 |
| WO | 2007091487 | 8/2007 |
| WO | 2008040672 | 4/2008 |

OTHER PUBLICATIONS

Fiberon DeckPilot Mar. 2009.
Fiberon DeckPilot Dec. 2009.
Kreg Jig downloaded from http://kregtool.com/products/pht/product.php?PRODUCT_ID=109.
Kreg Jig Jr. downloaded from http://kregtool.com/products/pht/product.php?PRODUCT_ID=32.
Kreg Micro Pocket Drill Guide downloaded from http://kregtool.com/products/pht/product.php?PRODUCT_ID=113.
Bostitch MIIFN—Hardwood Flooring Cleat Nailer downloaded from http://www.bostitch.com/default.asp? CATEGORY=FLOORING+NAILERS&TYPE=PRO . . . .
Eurotec 50X Tool from https://www.eurotec.team/en/products/deck-construction-and-landscaping/drill-tool-50x Board Range 108 + 33, downloaded Jan. 11, 2023.
Fiberon Deck Pilot from chrome-extension://efaidnbmnnnibpcajpcglclefindmkaj/http://www.bbslumber.com/documents/resources/dec k-pilot-for-outdoor-flooring.pdf, downloaded Jan. 11, 2023.
ESSVE HDS from https://www.essve.com/en/products/construction--and-wood-screw/decking-screw/hds--mounting-tool/installation-tool-hds/, downloaded Jan. 11, 2023.
Fast from https://www.deck-tool.com/en/#features-1, downloaded Jan. 11, 2023.
Heco from https://www.clasohlson.com/se/Trallverktyg-Heco-Decking-Tool/p/41-5068, downloaded Jan. 11, 2023.
Kreg Deck Jig from https://www.kregtool.com/shop/pocket-hole-joinery/general-joining/deck-jig/KJDECKSYS20.html, downloaded Jan. 11, 2023.
Motek from https://verktoy24.no/nyheter/nytt-verktoy-for-skjult-skruing-av-edle-terrassebord/, downloaded Jan. 11, 2023.
NKT Deck Pro from https://www.nktfasteners.com/da/deck-pro, downloaded Jan. 11, 2023.

* cited by examiner

FASTENER INSTALLATION TOOL AND RELATED METHOD OF USE

BACKGROUND OF THE INVENTION

The present invention relates to fastening systems, and more particularly to a tool for installing fasteners in the sides of boards to fasten the boards to an underlying substrate.

Fasteners are commonly used to fasten a workpiece, such as a wooden or composite board, to a substrate, such as a subfloor, joist or other underlying support structure. In the field of deck building, some fasteners come in the form of threaded screws, each including a large, bugle-shaped head to which an installation drive attaches (for example, a Phillips or star drive screw head), a threaded shaft and a sharp point. Such screws typically are drilled downward, in an orthogonal manner, into the top of a board to fasten the board to an underlying support, such as a joist. Most of the holding power of such "bugle screws" come from the bugle-shaped head engaging the board.

While bugle screws are widely accepted in the industry, there have been developments in fastener technology that attach deck boards to an underlying joist with hidden fasteners, in the form of screws that penetrate a side surface of a deck board and are advanced at an angle through the side surface, rather than the exposed upper surfaces or tops of the boards, and subsequently into an underlying joist. When boards are placed side-by-side one another, these hidden fasteners are relatively unnoticeable by an observer looking straight down at the boards.

An issue with such hidden fasteners is that they typically require a special tool to install them relative to boards. One popular hidden fastener installation tool is the CAMO Marksman® Pro-X1 Deck Tool, commercially available from National Nail Corporation of Wyoming, Michigan. This tool works exceptionally well in most applications. This tool includes forward and rearward screw guides that include identical gap spacers. To ensure that the tool consistently provides identical spacing between adjacent deck boards, the tool includes spacers having identical dimensions. For example, both spacers are identical in width, say ¼ inch, so that when boards are placed under and outwardly adjacent either spacer, each spacer creates an identical gap, that is ¼ inch, between all the boards. The identical spacers ensure that no matter what direction the tool is oriented, the tool produces the exact same gap with either spacer. This can ensure that novice tradesman or do it yourselfers will always set the same gap with either spacer between adjacent boards with the tool.

The above tool also includes a guide holder that holds a screw guide, however, this guide holder has some play to accommodate uneven or inconsistent boards. The guide holder also is only held in place relative to the remainder of the tool with a simple pin that provides limited adjustability. The guide holder works well, but due to the play provided, the guide can excessively wobble, which sometimes can provide inconsistent screw advancement into boards as the guide guides a screw. In extreme cases, the loose screw guide can misdirect a screw and unintentionally miss, damage or split a board.

While conventional hidden fastener installation tools get the job done, there remains a long felt need for improvements to such tools to better fasten down boards and other items with fasteners driven through the sides of the boards in a manner that generally conceals those fasteners.

SUMMARY OF THE INVENTION

A fastener installation tool is provided with a first fastener guide that guides a fastener into a side of a workpiece at an angle, and includes a pusher block that can be used to urge the workpiece toward an adjacent workpiece. The tool can include a second fastener guide having a spacer with a spacer width that establishes a predetermined gap between the adjacent workpieces.

In one embodiment, the pusher block can be strengthened via a pusher block width that is greater than the spacer width to withstand forces when the pusher block urges one workpiece toward another. The pusher block width can be at least 25%, at least 50%, at least 75% or at least 100% greater than the spacer width.

In another embodiment, the second guide can be selectively moveable in a guide tube and able to be clamped in a selected location therein to set the second guide and therefore the spacer attached thereto, a predetermined distance from the pusher block to accommodate a variety of board sizes.

In still another embodiment, the tool can be operable in a clamp mode in which the pusher block and the spacer are moveable toward one another to clamp a workpiece therebetween, thereby holding the first and second guides in fixed orientations relative to the workpiece for accurate and consistent installation of fasteners therein, through respective side surfaces thereof.

In yet another embodiment, the tool can include a tool frame. The frame can include a guide tube having first and second walls. The second guide can be disposed at least partially in the guide tube between the first and second walls. A fastener can project through the guide tube and the second guide to clamp the second guide between the first and second walls in a capture mode.

In even another embodiment, the guide tube can define an upper channel. The second guide can be disposed at least partially in the guide tube. The second guide can include a fastener tube extending from the second guide and defining at least a portion of the second guide bore. The fastener tube can be selectively moveable within the upper channel when the second guide is moved relative to the guide tube. In some cases, the fastener tube can be oriented relative to the guide tube so that the angled bore of the guide projects out from the guide tube, within the fastener tube.

In a further embodiment, the tool can include a stationary handle projecting from a first end of a tool frame in a cantilevered manner over the pusher block to provide leverage to urge the pusher block against the workpiece and accordingly, the workpiece toward another workpiece. The workpieces can be held apart from one another and gapped by the spacer width disposed between the workpieces.

In still a further embodiment, the tool can include a moveable handle joined with the tool frame and moveable relative to the stationary handle. The first guide and the pusher block can be operably joined with the moveable handle. When the moveable handle is moved in a first direction relative to the stationary handle, this moves the pusher block away from the spacer in an open mode. In this mode, a workpiece opening sized to receive a workpiece therein can be established between the pusher block and the spacer in the open mode.

In yet a further embodiment, the moveable handle can be moveable in a second direction relative to the stationary handle to move the pusher block toward the spacer in a clamp mode to clamp the first workpiece therebetween. In the clamp mode, the first angled bore of the first guide and the second angled bore of the second guide are each held in a respective preselected orientation relative to the first workpiece in the clamp mode.

In even a further embodiment, a method of installing a fastener with the tool is provided. The method can include placing a first workpiece adjacent a second workpiece and over a substrate; providing a tool including a spacer that extends downwardly and is adapted to occupy a first space adjacent a first side surface of the first workpiece, a guide defining an angled bore extending along an axis adapted to be placed at a non-orthogonal angle relative to the first side surface of the first workpiece, the angled bore adapted to guide a fastener from the angled bore immediately adjacent the first side surface of the first workpiece, and a pusher block that extends downwardly distal from the spacer; urging the first workpiece toward the second workpiece with the pusher block, with the spacer located between the first workpiece and the second workpiece so as to set a gap between the first workpiece and the second workpiece equal to a spacer width of the spacer; and advancing the fastener along the axis of the angled bore so that the fastener enters the side surface and advances at least partially through the first workpiece and into the substrate to join the first workpiece to the substrate adjacent the second workpiece.

In another embodiment, the pusher block has a pusher block width that is greater than the spacer width so that the pusher block is incapable of setting the gap between the first workpiece and the second workpiece equal to the spacer width after the fastener advancing step.

In even a further embodiment, the method can include clamping the first workpiece between the pusher block and the spacer. The method also can include clamping the guide between first and second sidewalls of a guide tube with an adjustment fastener so that the guide is immovable within the guide tube.

The installation tool described herein can easily and consistently register with a workpiece so that one or more fasteners installed with the tool are properly aligned with a desired surface of the workpiece. The installation tool can be securely and precisely joined with a workpiece where it includes a clamping mechanism. This can promote accurate advancement of the fastener into the workpiece. In addition, when a pusher block is incorporated into the tool, it can facilitate manipulation and placement of the workpiece relative to another workpiece and setting of a proper and consistent gap between the workpieces with a corresponding spacer. Where the pusher width is greater than the spacer width, the pusher can be stronger, so it can be used to adequately and consistently push workpieces without concern of structural failure of the tool. Where the tool includes a guide tube with a guide adjustably disposed in the guide tube, that guide can be rigidly and precisely clamped between walls of that guide tube. In turn, the guide is sturdy and centered, and does not wobble or move relative to the tool or its frame.

These and other objects, advantages, and features of the invention will be more fully understood and appreciated by reference to the description of the current embodiment and the drawings.

DETAILED DESCRIPTION OF THE CURRENT EMBODIMENTS

Figure 1:
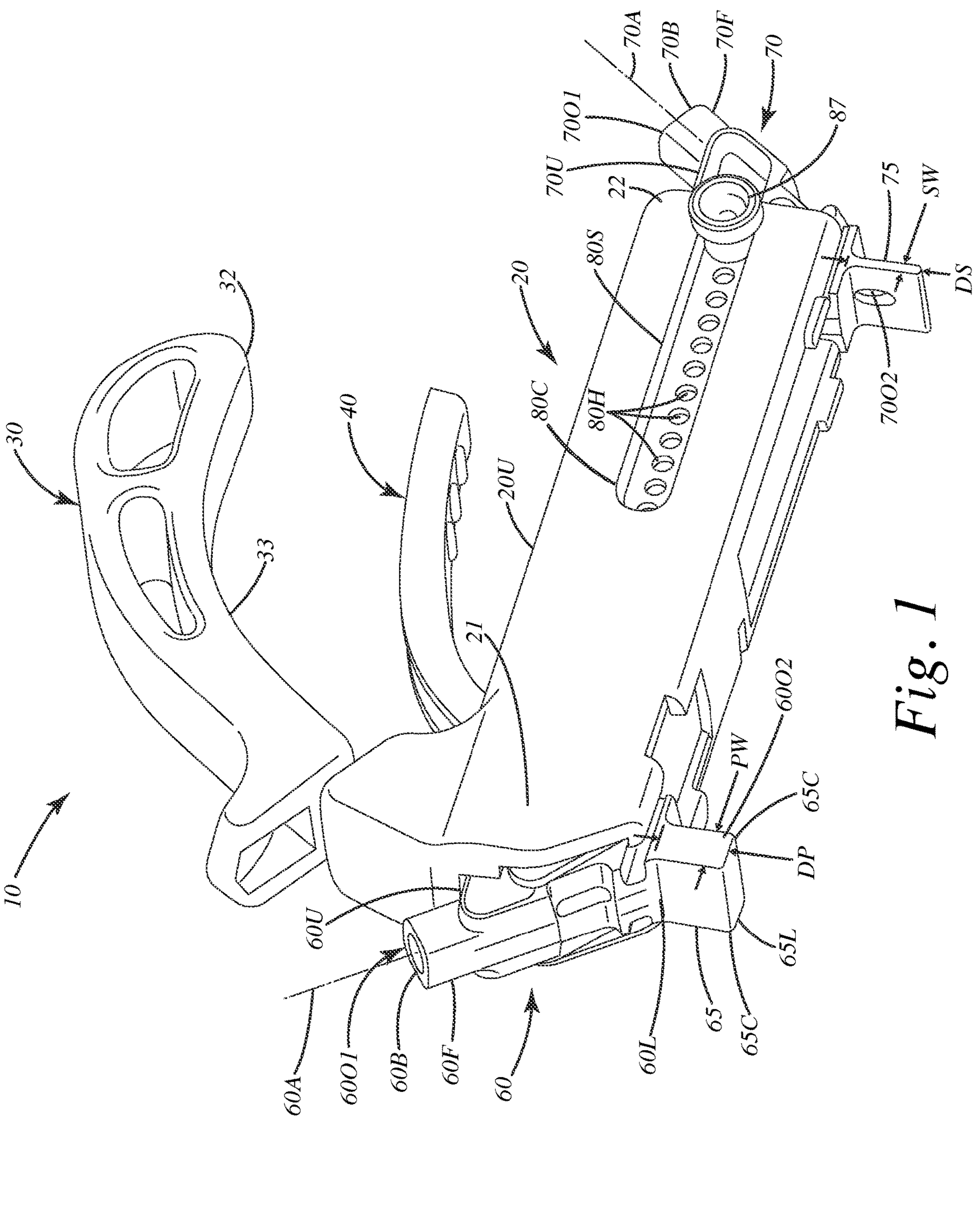
FIG. 1 is a perspective view of a current embodiment of a fastener installation tool.

A current embodiment of a fastener tool is illustrated in FIGS. 1-5 and generally designated 10. The tool 10 can include a frame or body 20 to which a stationary handle 30 and movable handle 40 are attached. The frame can include or have joined with it a first guide 60 and a second guide 70, disposed at opposite first 21 and second 22 ends of the frame 20. More particularly, these guides can be mounted in a guide tube 80, with the second guide 70 slidably received by that guide tube and adjustable, movable or otherwise reorientable relative to the first guide 60. A pusher block 65 joined with the first guide 60 can project downwardly from the first guide and can have a pusher block width PW. A spacer 75 joined with the second guide 70 can project downwardly from the second guide and can have a spacer width SW. The pusher block width PW can be greater than the spacer width SW. The spacer can be specifically designed to set a gap G1 between adjacent workpieces as described below corresponding to the particular spacer width SW of the spacer 75.

In contrast, the pusher block 65 can be configured and designed to enable a user to use the pusher block to forcibly urge, push and/or move a workpiece located between the pusher block 65 and the spacer 75 toward another adjacent workpiece as described below. Due to its enhanced pusher block width PW, which is greater than the spacer width SW of the spacer 75, the pusher block 65 can be well-suited to transmit forces from the tool 10 to a workpiece. However, due to that greater pusher block width PW, the pusher block 75 cannot and is not used to set gaps between workpieces that have already had their respective gaps set by the spacer 75 and the corresponding spacer width SW.

In most cases, the pusher block 65 will not establish, set, create or produce any gap between adjacent workpieces that are the same dimension as the gap set by the spacer 75 at the spacer width SW. With this configuration of the tool 10 having the spacer as well as a pusher block, the tool can serve multiple purposes, but can be only unidirectional when applying fasteners into workpieces. For example, a user consciously aligns the spacer 75 between adjacent workpieces, and cannot and does not insert the pusher block 65 between those workpieces after the workpieces have been fastened relative to one another. Again, this is because the pusher block 65 can be configured to push, rather than set gaps, between the workpieces.

Figure 8:
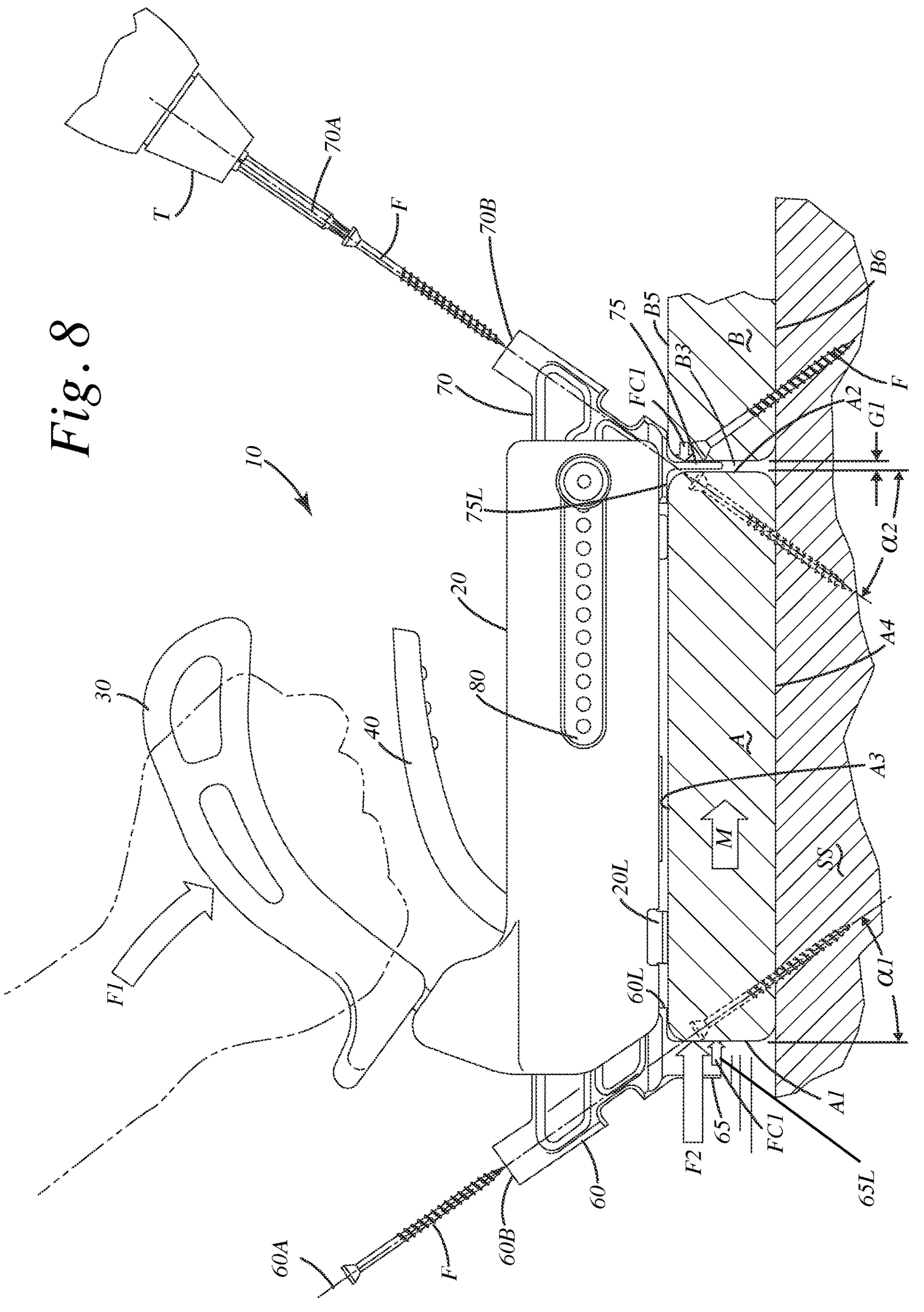
FIG. 8 is a side view of the tool being moved over first workpiece, the pusher block being used to push the first workpiece against a second workpiece, and the spacer establishing a gap between the first workpiece and the second workpiece with a spacer width.

While this configuration of the tool 10 sacrifices bidirectional operation of the tool, for example, by preventing or impairing use of either of the spacer 75 and or the pusher block 65 to establish gaps between workpieces, it also enables a user to provide enhanced or increased forces when moving workpieces for fastening and installation of fasteners through those workpieces. It also assists the user in aligning the stationary handle 30 such that the handle can be used to transfer a force F1 from the user through the frame 20 to the respective pusher block 65 which is disposed below the subframe 35 of the handle 30. In turn, this allows direct transmission of a user force F1 through the handle 30 to the pusher block 65 to generate a force F2 as shown in FIG. 8 and move a first workpiece A toward another workpiece B in direction M with fluidity and ease, and without concern of the pusher block 65 breaking, bending, flexing or otherwise becoming compromised.

The installation tool 10 described here is well suited to install fasteners relative to a variety of workpieces. The fasteners F installed with the installation tool can be any type of fastener. One fastener suited for use with the installation tool is described in U.S. Pat. No. 9,751,197 to VandenBerg, entitled "Fastener, Installation Tool and Related Method of Use," issued Sep. 5, 2017, and hereby incorporated by reference in its entirety. Of course, tool 10 can be used to install any other type of screw or other fastener. Generally, the tool can be used to start and advance the above mentioned fasteners, or other fasteners, into one or more workpieces to join those workpieces to a substrate in the manners explained herein above. For example, a tool can be used to start a screw and subsequently advance the screw through the side of a board and subsequently into a substrate, such as an underlying or adjacent joist, floor, roof, wall, deck or other structure.

It will be noted that the fastener installation tool 10 can be used in connection with installing fasteners relative to a variety of workpieces and substrates. Such workpieces are generally described herein as a first workpiece A, a second workpiece B, a third workpiece C, etc. As shown herein, the workpieces can be in the form of boards, panels or structures constructed from wood, composites, polymers, concrete, metal or other materials. Generally, when used herein, boards can be any of the workpieces described herein. Further, as described below, the boards or workpieces can be joined with an underlying substrate SS which can be a joist, subfloor, floor, wall or other structure. Further, although shown as a horizontally oriented structure, the workpieces and substrate can be oriented vertically or at some angle relative to vertical and/or horizontal.

Figure 6:
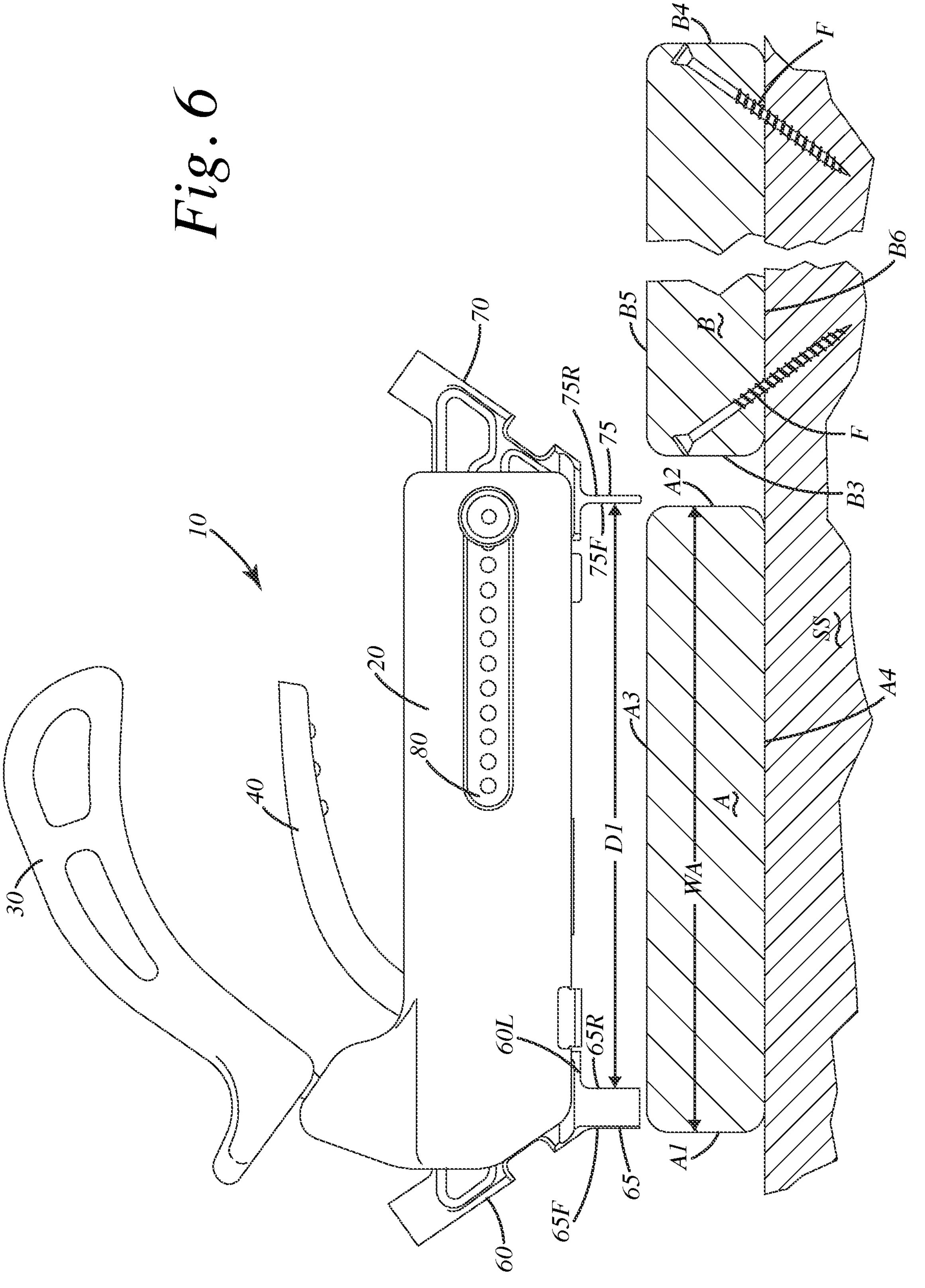
FIG. 6 is a side view of the tool in an open mode being moved toward a first workpiece for application of fasteners thereto.

An example of a particular workpiece is shown in FIG. 6 and described with reference to workpiece A. That workpiece A can include a first side surface A1, a second side surface A2, an upper surface A3 and a lower surface A4. The upper and lower surfaces A3 and A4 can be generally parallel to one another, with the lower surface A4 configured to engage and lay on or adjacent the substrate SS when the board A is placed relative to the substrate SS, which again can be in the form of an underlying joist as shown or other structures. The upper and lower surfaces can be generally perpendicular to the side surfaces A1 and A2. The side surfaces A1 and A2 can be generally parallel to one another and can delineate the edges or sides of the boards through which the fasteners F described herein are advanced to install the workpiece A relative to the substrate SS in a permanent and/or fixed and immovable manner.

The workpiece B, which is shown as already being installed with fasteners and secured relative to the underlying substrate SS can likewise include side surfaces B3 and B4, and upper and lower surfaces B5 and B6. These surfaces can be identical and similarly situated relative to one another as the surfaces of the first workpiece A described above. Each of the workpieces or boards A and B can have a length that projects into the page, for example in FIG. 6. The length of each board can vary, but can be optionally longer than 1 foot, longer than 2 feet, longer than 3 feet, longer than 4 feet, longer than 5 feet, longer than 10 feet, longer than 12 feet, longer than 14 feet, longer than 16 feet or other dimensions depending on whether the board is cut for a particular length and purpose. The boards A and B can be placed parallel to one another and set at a particular gap G1 with the spacer 75 of the tool 10 as described in detail below.

Figure 2:
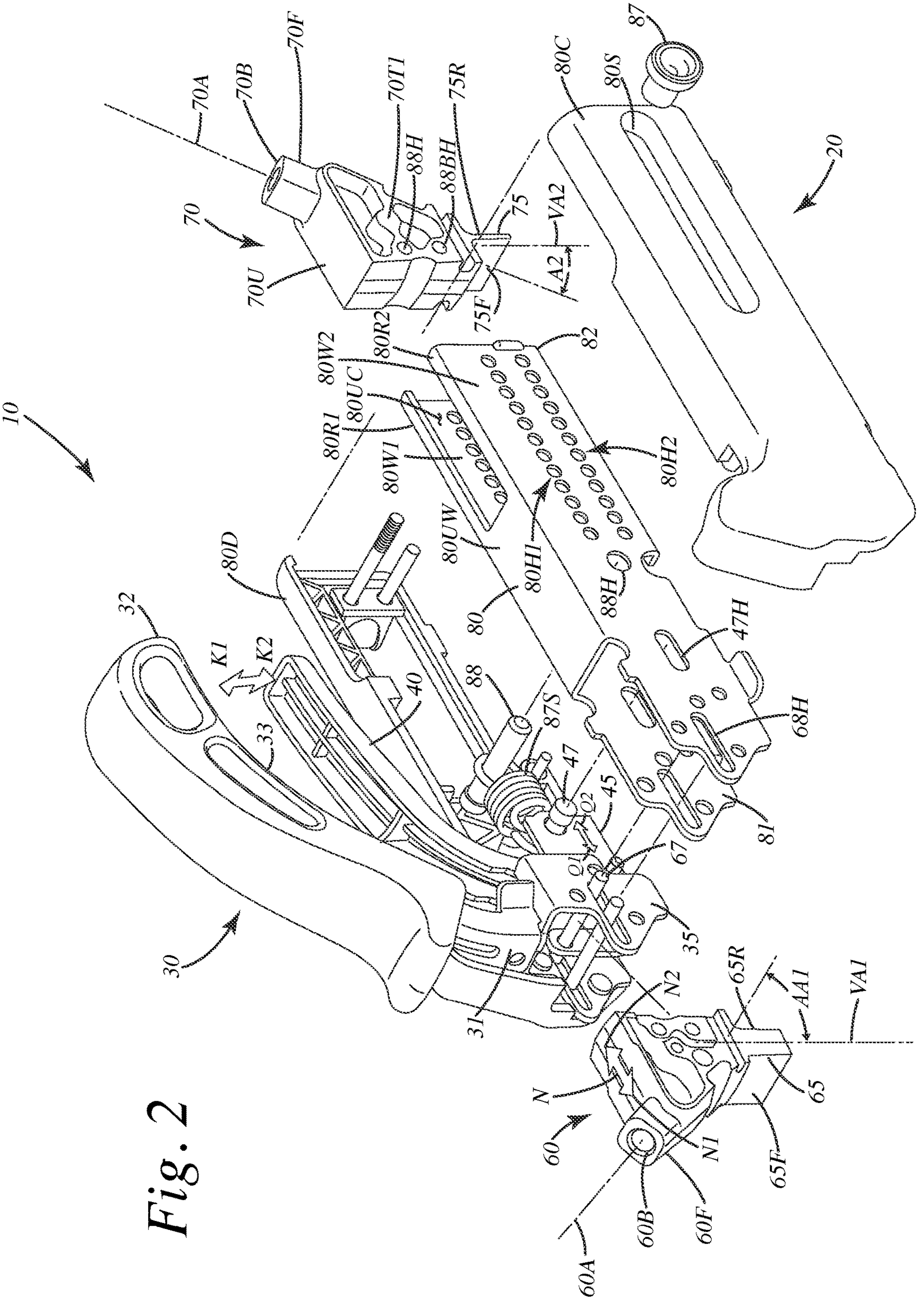
FIG. 2 is an exploded perspective view of the tool.
Figure 3:
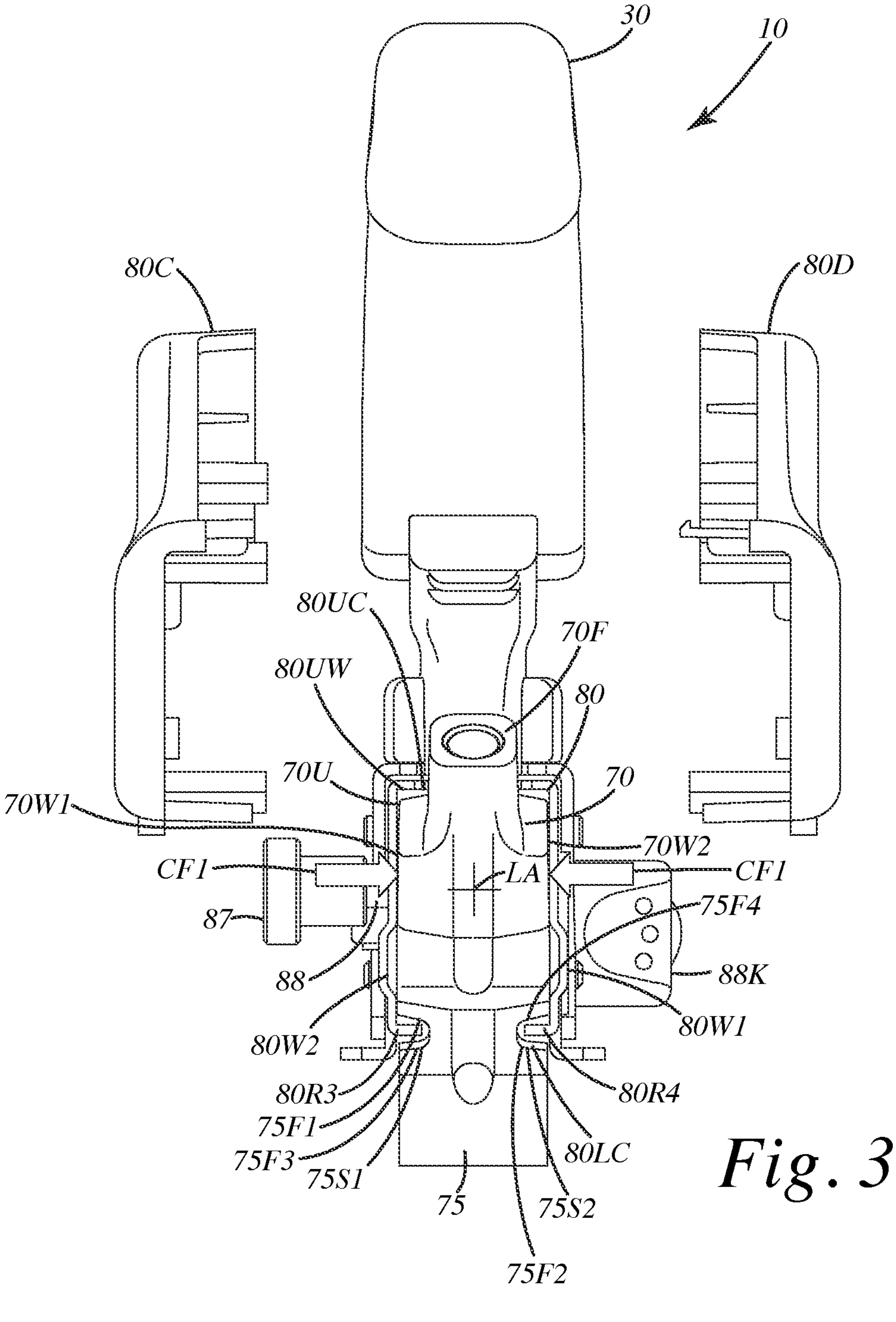
FIG. 3 is a rear view of a second guide of the tool in a guide tube with rails interacting with slots of the second guide and the second guide in a capture mode.

Turning now to FIGS. 1-3, the components of the tool 10 now be described in more detail. As mentioned above, the tool 10 can include a frame 20 which may include a variety of components. The tool also can include a stationary handle 30 and a movable handle 40. The stationary handle 30 can be secured to a fixed and immovable handle subframe 35. This subframe 35 can be further fixedly and immovably secured to the front portion 81 of a guide tube 80. The stationary handle 30 can include a stationary handle base 31 and a second or free end 32. The base 31 can be secured directly to the handle subframe 35. The second end 32 can extend along with the grasping surface 33 of the stationary handle in a cantilevered manner upward and away from the upper surface 20U of the frame 20. Again, this stationary handle can remain stationary relative to the frame 20 and in particular the guide tube 80. These two elements, the stationary handle 30 and guide tube 80 can thus remain in a fixed, unmoving relationship relative to one another. These elements can be riveted, screwed, pinned or otherwise fixedly attached to one another via the subframe 35 of the stationary handle 30 attached to the guide tube 80.

The frame 20 also can include a movable handle connector 45. This connector can be joined via a spring or other biasing element 87S to a fixed and immovable pin 88 that registers with a corresponding whole 88H defined by the guide tube 80. The connector 45 can further be joined with a slidable or movable pin 47 that registers in an elongated slot 47H. The movable handle connector 45 can further be joined with guide pins 67 that join the first guide 60 directly and fixedly with the connector 45. Accordingly, these components, the connector 45 and the guide 60, can move in unison with one another. The guide pins 67 can be slidably mounted in a corresponding elongated slot 68H, such that the slot 68H can guide the movement of the first guide 60 in direction N relative to the frame 20 in a clamp mode and in an open mode as described below.

Figure 7:
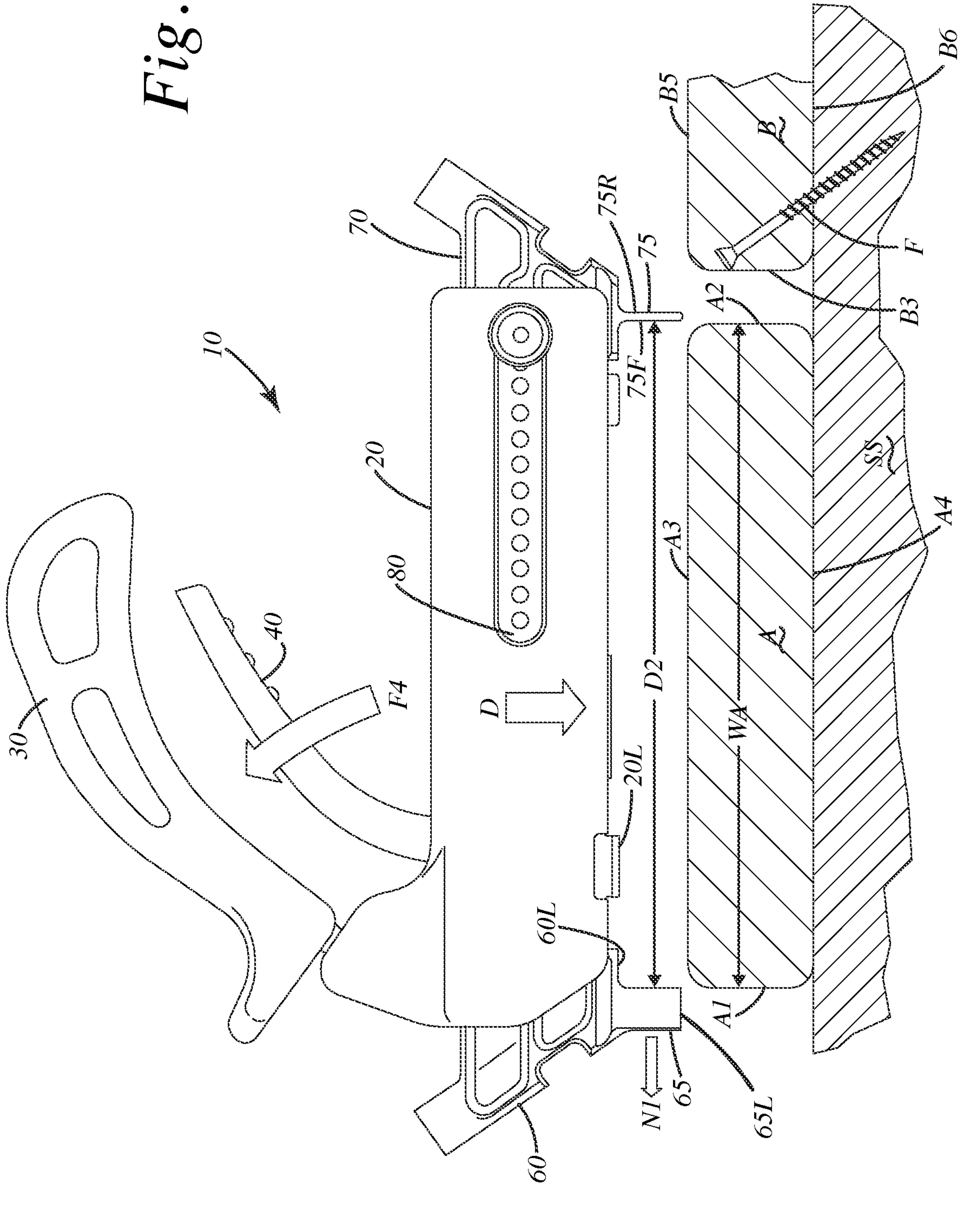
FIG. 7 is a side view of the tool being expanded to move a pusher block relative to a spacer to fit the first workpiece.

As shown in FIGS. 2, 6 and 7, the movable handle 40 can be manipulated by user to operate the tool 10 in an open mode and in a clamp mode. For example, a user can pull the movable handle 40 in direction K1 with force F4 toward the stationary handle 30. This in turn moves the connector 45 in direction Q1, thus pulling the biasing element 87S or spring and elongating it, with the spring 87 urging the connector 45 in direction Q2. The connector 45 connected to one of the guide pins 67 thus moves the guide 60 in direction N1 and thereby increases the distance D1 (FIG. 6) between the pusher block 65 and the spacer 75 to a new distance D2 (FIG. 7). When the user releases the movable handle 40, it moves in direction K2 away from the stationary handle 30 via the urging of the biasing element 87S. This in turn moves the connector 45 in direction Q2, all while the pins 47 and 67 move within the respective slots 47H and 68H in the guide tube 80.

With the connector 45 attached to the guide 60, the guide 60 also can move in direction N2 thereby moving the pusher block 65 back toward the spacer 75. As a result of the spring force generated by the spring 87S a clamp force FC1 (FIG. 8) is exerted by the tool 10 on the workpiece A, in particular its side surfaces A1 and A2 as described below. With this clamping force FC1 exerted on the board A, the tool 10 is in the clamp mode. An additional force F2 can be applied in addition to the clamping force FC1 via application of a user force F1 on the handle 30 to urge the pusher block 65 into the board side surface A1 of the workpiece or board A as described below.

As mentioned above, the first guide 60 can include the pusher block 65. The first guide can include an angled bore 60B that extends along a bore axis 60A. The bore axis can be transverse to the vertical axis VA1 of the pusher block 65, and can be disposed at a predetermined angle AA1. This angle AA1 can be optionally 10 degrees to 90 degrees, inclusive, 10 degrees to 60 degrees, inclusive, 10 degrees to 45 degrees, inclusive, 10 degrees to 30 degrees, inclusive, 20 degrees to 45 degrees, inclusive, or other angles depending on the application. The tool can advance a fastener F into a first side surface A1 or second side surface A2 of a board A at a similar angle to AA1. This angle can generally be non-orthogonal to the side surface. The second guide 70 can include a similar or identical bore 70B and bore axis 70A, offset at a similar angle A2 as A1 from a vertical axis VA2 of the spacer 75 but in an opposite direction, for example, generally toward the first or front end 81 of the frame 80.

Returning to FIGS. 1 and 2, the first guide 60, as well as the second guide 70, can include respective fastener tubes or bore extensions 60F and 70F that can be coextensive with the respective bores of the guides, and can incorporate portions of those bores therein. Because the extensions 60F and 70F are substantially similar, only the fastener tube or extension 60F will be described here. The tube 60F can extend upward from an upper guide surface 60U, and can effectively extend the length of the bore. In some cases, the bore itself can include a stepped interior, with a shoulder extending therearound near the pusher block to stop advancement of some tool bits. The extension 60F can be offset from that upper surface and also can extend forwardly of the pusher block and the upper corner of the guide 60 a predetermined distance. The extra length added to the bore in this manner can allow longer screws to be used with the guide 60.

The first guide 60, as mentioned above, can include the first angled bore 60B. That angled bore, whether or not extended by the fastener tube 60 F, can include a first opening 6001. This opening can enable the fastener to enter the first angle bore 60B. Distal from and at the opposite end of the first angled bore 60B, the guide can include a second opening 6002 adapted to enable a fastener to exit the first angled bore, optionally through at least a portion of the pusher block 65. These first and second openings can be aligned along the first axis 60A which again can be disposed at a preselected nonorthogonal angle relative to a side surface of the workpiece. The second guide 70 can likewise include first opening 7001 and a second opening 7002 that are similar to the first and second openings of the first guide 60 and will not be described again here.

Turning to FIGS. 1, 2 and 6, the pusher block 65 can extend from the lower surface 60L of the guide 60. The pusher block 65 can project downwardly from the first guide 60 and in particular its lower surface 60L a first distance DP. This first distance DP can be optionally at least ¼ inch, at least ½ inch, at least ¾ inch or other distances. The pusher block 65 also can include the pusher block width or first width PW extending from a first forward face 65F to a first rearward face 65R. Optionally, the lower end 65L of the pusher block 65 can be flat, planar and/or smooth, and can transition to the front and rear faces 65F and 65R of the block at respective corners 65C. The pusher block width PW can be optionally at least 25%, at least 30%, at least 40%, at least 50%, at least 60%, at least 75% the distance DP. In some cases, the pusher width PW can be ⅛ inch, $^{3}/_{16}$ inch, ¼ inch, $^{7}/_{16}$ inch, half inch or other widths. With this increased width, the pusher block can have enhanced rigidity and strength to withstand pushing forces translated through it to a board when pushing the board toward another board with the tool.

As shown in FIGS. 2-3, the first guide 60 can be pinned or fastened to the connector 45 and guide tube 80 or frame 20 with pins 67. These pins can be installed so that while moveable relative to the frame 20 and second guide 70, in the open mode or the clamp mode, the guide 60 is not removeable from the tool or frame without damaging, destroying or impairing function of the tool 10. This can be different from the second guide 70, which itself can be removeable, replaceable and able to be moved relative to the guide tube 80 to change the distance D3 (FIG. 4) between the spacer 75 and pusher block 65 to a different distance D4 (FIG. 5) to accommodate workpieces or boards having different widths.

Figure 4:
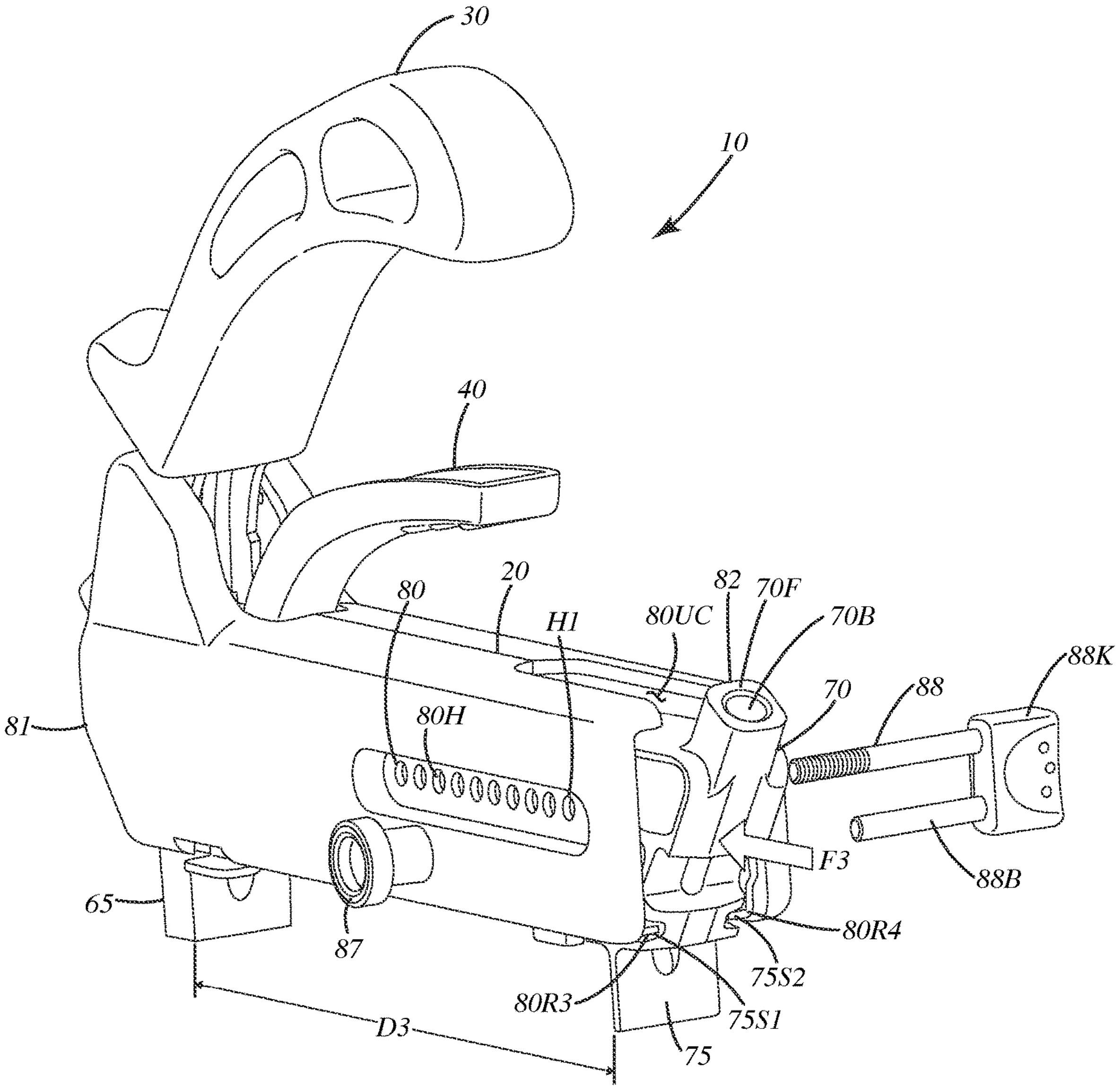
FIG. 4 is a rear perspective view of the tool with the second guide in an adjustment mode relative to the guide tube.
Figure 5:
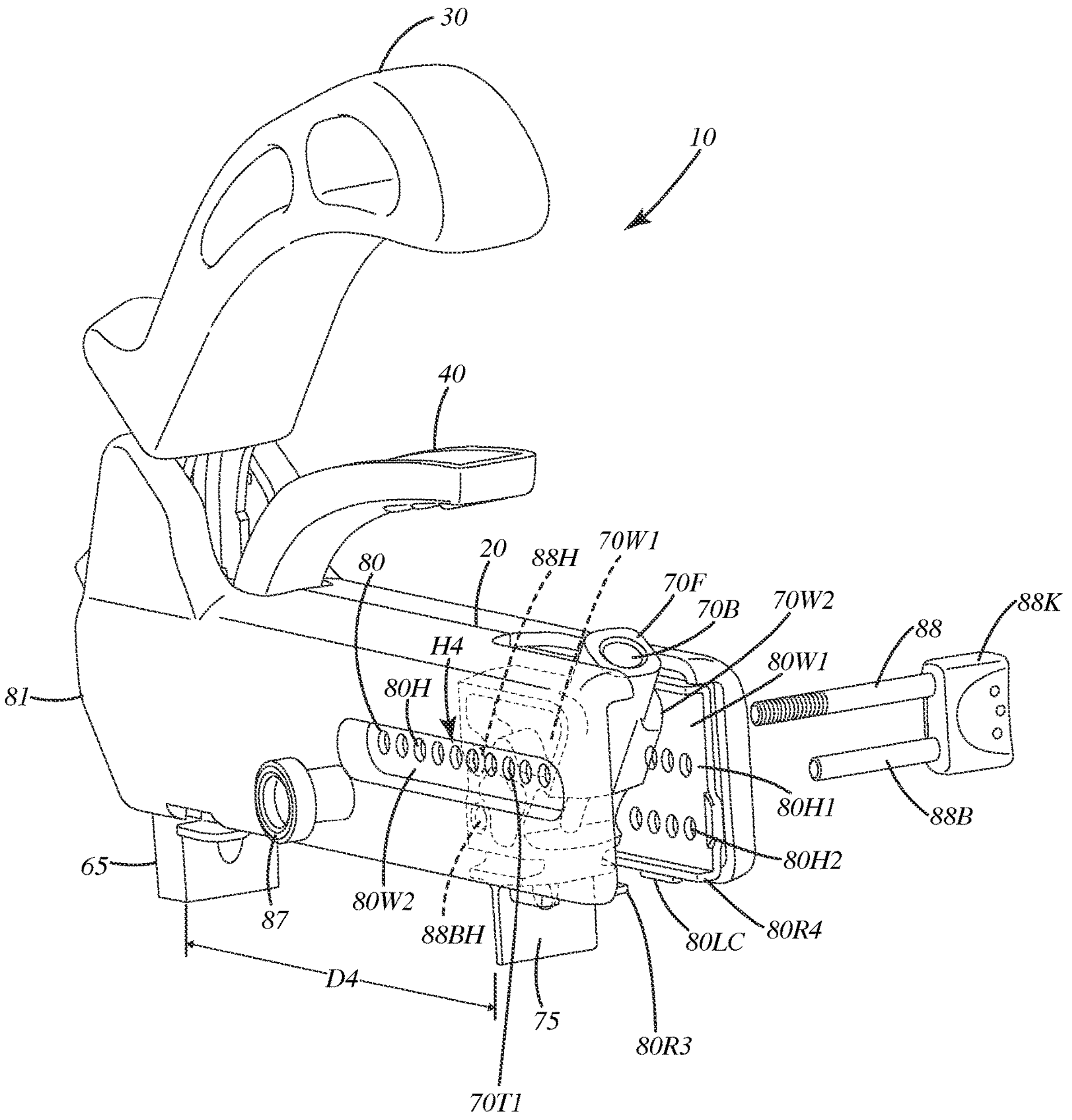
FIG. 5 is another rear perspective view of the tool with the second guide in a further stage of the adjustment mode relative to the guide tube.

As shown in FIGS. 3-5, the second guide 70 can be located at a second end 22 of the frame 20, distal from the first end 21 of the frame at which the first guide 60 is located. Again, the second guide can be joined with the frame in a selectively adjustable manner to change, modify or alter the distance between the spacer 75 and the pusher block 65. One construction to facilitate this adjustability is shown in FIGS. 3-5. In FIG. 3, the tool 10 is shown with a second guide 70 disposed in the guide tube 80. First and second covers 80C and 80D are removed from the guide tube 80 as shown there. These covers 80C and 80D can be constructed from plastic, composite, or other materials, and can be positioned over the guide tube and portions of the connector, subframes and guides to conceal and protect these items. Optionally, the first side cover 80C can include a slot 80S. The slot can be aligned with one or more banks or rows 80H1, 80H2 of adjustment holes 80H defined by a portion of the guide tube 80. The slot also can be configured to receive a nut 87 that can be secured to an adjustment fastener 88 to effectively clamp and secure the second guide 70 in a capture mode within the guide tube 80. As shown in FIG. 2, the guide tube 80 upper bank 80H1 and lower bank 80H2 of holes can extend through both sidewalls 80W1 and 80W2. These guide tube sidewalls can transition to an upper wall 80UW that can close off the upper extent of the guide tube 80. The upper wall 80UW can define an upper channel 80UC. This upper channel 80UC can accommodate the fastener tube 70F of the second guide 70. Indeed, this fastener tube can be slidably mounted in at least a portion of this upper channel 80UC. When the fastener tube 70B is disposed in the channel 80UC, the fastener tube projects a distance above the upper wall 80UW and beyond the sidewalls 80W1 and 80W2. Moreover, when the fastener tube is disposed in the upper channel, it can move within the upper channel when the second guide 70 is moved relative to the guide tube 80 to provide an adjustment to the second guide and accommodate a variety of different board sizes and overall widths.

As further shown in FIGS. 2-5, the guide 70 can include an upper surface 70U. This upper surface 70U can be guided by the upper rails 80R1 and 80R2 of the respective sidewalls 80W1 and 80W2. These rails 80R1 and 80R2 can bound the upper channel 80UC and can extend to the upper wall 80UW of the guide tube 80. As mentioned above, the sidewalls 80W1 and 80W2 can extend outwardly and form a portion of the guide tube 80. These walls can extend downwardly and transition to a first rail lower rail 80R3 and a first lower rail 80R4 which are disposed on opposite sides of the lower channel 80LC and of the longitudinal tube axis LA of the guide tube 80. Each of these rails can extend inward, toward the tube axis LA, similar to the upper rails 80R1 and 80R2 at the top of the guide tube 80. The guide 70 can define a first slot 75S1 and a second slot 75S2 on opposite sides of the tube axis TA and/or the angled bore. These slots can be defined above the spacer 75 and below the fastener tube 70F. These slots can be bounded by respective flanges 75F1 and 75F3, as well as 75F2 and 75F4. The flanges can extend outwardly relative to the centerline of the guide 70.

The slots 75S1 and 75S2 can receive the rails 80R3 and 80R4. In effect, the rails can slide or move relative to the slots and vice versa. Generally, the guide 70 can be adjusted and can move within the guide tube and lower channel, sliding with the rails in the slots, to provide consistent and stable adjustment of the guide relative to the guide tube. The interfitment of the rails within the slots, as well as the interaction of the upper surface 70U of the guide 70 with the upper rails 80R1 and 80R2 can prevent wobble or excess movement of the guide as it is adjusted by user to move the spacer 75 relative to the pusher block 65, to provide a relatively tight fit of the guide within the guide tube, while still allowing the guide to move relative to the guide tube. The sidewalls 70W1 and 70W2 of the guide also can closely fit adjacent and/or engage the sidewalls 80W1 and 80W2 of the guide to further provide a relatively close or tight fit between the guide tube and the guide that is secured therein with the fastener 88 as described below.

As further shown in FIGS. 2 and 5, the sidewalls 70W1 and 70W2 optionally can include one or more truss structures for example trusses 70T1. These truss structures can provide enhanced rigidity to the guide when it is clamped in a capture mode within the guide tube 80 as described below. In particular, as mentioned above, the second guide 70 is selectively movable relative to the guide tube 80 to accommodate a variety of different board widths, generally between the spacer 75 and the pusher block 65. For example, as shown in FIGS. 4 and 5 the distance between the pusher block 65 and the spacer 75 is changed from distance D3 to a lesser distance D4. Initially, the second guide 70 can be secured and clamped in a capture mode between the first and second walls 80W1 and 80W2 of the guide tube 80. This clamping effect can be provided via a fastener 88 that is disposed through the guide tube 80 and secured with a nut 87. This nut 87 can be tightened and disposed within the slot 80S of the cover. The fastener 88 can extend through the upper or first bank of holes 80H1 defined by the guide tube 80. The fastener 88 can be attached to a key 88K. The fastener 88 also can be integrally formed or joined with a reference bar 88B, which can be parallel to and offset relative to the fastener 88. This bar 88B can extend through the second or lower bank 80H2 of the holes defined by the guide tube 80. The guide 70 can define corresponding holes 88H and 88BH, through which the fastener 88 and the bar 88B can extend. Optionally, as shown, the fastener 80 can include a set of threads to receive the nut 87, while the bar 88B may include no threads and is not coupled to a nut. The fastener 88 can extend through a corresponding upper hole and the bar 88B can extend through a corresponding lower hole to provide the guide 70 with enhanced stability.

With reference to FIGS. 3, 4 and 5, adjustment to accommodate different width boards can be initiated by loosening the nut 87 relative to the fastener 88. As a result, the clamping force CF1 exerted by the fastener and nut can be reduced to zero. As a result, the guide and tube begin to transition from a capture mode, in which the second guide 70 is clamped between the sidewalls with the clamping force CF1, to an adjustment mode. After the nut 87 is removed from the fastener 88, the fastener 88 and the bar 88B can be removed from the respective holes H1. In particular, the fastener 88 can be removed from the hole H1 in the first bank 80H1 of holes, while the bar 88B can be removed from a corresponding hole in the second, lower bank 80H2 of holes. This is shown in FIG. 4. A force F3 can be applied to the guide 70 and thereby move the guide 70 within the guide tube 80. As a result, the rails and respective slots of the guide move relative to one another, as the guide slides or moves toward the first end 81 of the guide tube. As this occurs, the spacer 75 also starts to move toward the pusher block 65. The sidewalls of the guide 70 also move relative to the sidewalls of the guide tube. The fastener tube 70F can enter and/or move within the upper channel 80UC of the guide tube, and can slightly project through or above the guide tube. The second guide 70 also can move within the lower channel 80LC defined between the lower rails.

As shown in FIG. 5, after the guide 70 has been moved sufficiently such that the spacer 75 is at a selected distance D4 from the pusher block 65, the user can remove the force F3. The user can then install the fastener 88 through the bank of upper holes 80H1, and can install the bar 88B through the second or lower bank of holes 80H2. As this occurs, the fastener can move through the hole 88H of the guide, and the bar can move through the hole 88BH of the guide until entering the corresponding upper and lower banks of holes in the opposite side wall of the guide tube.

The fastener 88 can be secured with the nut 87. The nut can be tightened. When tightened, the nut 87 engages the first sidewall 80W1 of the guide tube 80. The key 88K likewise engages the opposite side wall 80W2. As this occurs, and the nut is continued to be tightened, it generates a clamping force CF1 on the guide 70 again, thereby clamping the guide between the respective sidewalls of the tube. The nut can be sufficiently tightened to secure the guide 70 in the capture mode shown in FIG. 5. As a result, the spacer 75 is disposed a new distance D4, which is less than the previous distance D3, from the pusher block 65.

Methods of using the installation tool can now be described with reference to FIGS. 6-9. In general, the method can include placing a first workpiece adjacent a second workpiece and over a substrate; providing a tool including a spacer that extends downwardly and is adapted to occupy a first space adjacent a first side surface of the first workpiece, a pusher block that extends downwardly distal from the spacer, and a guide defining an angled bore extending along an axis adapted to be placed at a non-orthogonal angle relative to the first side surface of the first workpiece, the angled bore adapted to guide a fastener from the angled bore immediately adjacent the first side surface of the first workpiece; urging the first workpiece toward the second workpiece with the pusher block, with the spacer located between the first workpiece and the second workpiece so as to set a gap between the first workpiece and the second workpiece equal to a spacer width of the spacer; advancing the fastener along the axis of the angled bore so that the fastener enters the first side surface and advances at least partially through the first workpiece and into the substrate to join the first workpiece to the substrate adjacent the second workpiece. As described above, the pusher block can have a pusher block width that is greater than the spacer width so that the pusher block is incapable of setting the gap between the first workpiece and the second workpiece equal to the spacer width after the fastener advancing step.

More particularly, with reference to FIG. 6, the tool 10 can be used to install fasteners F relative to workpieces A and B. The workpiece B can already be fastened down to a substrate SS by installation of the fasteners F in the side surfaces B3 and B4 of the board B. In turn, this fixedly secures the board B to the underlying substrate SS, which in this application, is shown as a joist that is perpendicular to the lengths of the boards A and B. A user can place the first workpiece A adjacent the second workpiece B, which again can be on or adjacent the substrate. The user can place the tool 10 above the first board or workpiece A. The user can recognize that the spacer 75 is placed a distance D1 from the pusher block 65, and that distance D1 does not correspond to the overall width WA of the board. As a result, the board A will not fit between the spacer in the pusher block.

Accordingly, the user can apply a force F3 to the movable handle 40, thereby moving it toward the stationary handle 30. As described above, this transitions the tool to an open mode and moves the first guide 60 in a direction N1, generally away from the second guide 70. As this occurs, the pusher block 65 moves away from the spacer 75, thereby increasing the distance between these elements from D1 to a greater distance D2. This greater distance D2 optionally can be greater than the overall width WA of the board A.

After the pusher block is opened up to the open mode, the user can move the tool direction D, toward the board A. As this occurs, the spacer 75 moves downward and adjacent the second side A2 of the board A. The pusher block 65 moves downward adjacent the first side A1 of the board A. This can continue until the lower surface 20L of the frame 20 contacts the upper surface A3 of the board A. The land 60L of the pusher block 65 and the land 75L of the spacer 75 also can engage the upper surface A3 of the first workpiece A.

When the tool 10 is placed relative to the first workpiece A, the user can release the movable handle 40, in which case it moves away from the stationary handle 30 in the manner described above, under the force of the biasing element 87S. The biasing element moves the guide 60 toward the guide 70, and thus the pusher block 65 toward the spacer 75. In turn, the biasing element 87S enables the pusher block 65 and spacer 75 to exert a clamping force FC1 on the workpiece or board A. Specifically, the spacer 75 exerts a first part of the clamping force FC1 against the second side surface A2 of the workpiece. The pusher block 65 exerts the corresponding clamping force FC1 against the first side surface A1 of the first workpiece A. This effectively secures the tool 10 to the workpiece A with the clamping forces in a clamp mode. It also engages the respective inner surfaces of the pusher block and the spacer against the side surfaces of the first workpiece A.

With the tool 10 in the clamp mode, shown in FIG. 8, over the first workpiece A, a user can then use the tool 10 to move the first workpiece A relative to the second workpiece B. In particular, the user can apply a force F1 to the stationary handle 30, in a direction generally toward the second workpiece B, which is already fixed to the underlying substrate SS. This translates to a movement M of the first workpiece A toward the second workpiece B. In particular, the user applied force F1 can translate through the handle 32, the first guide 60 and directly to the pusher block 65. As a result, the first workpiece A is urged toward the second workpiece B with the pusher block via force F2 applied via the pusher block and tool in general. The spacer 75 is of course located between the first workpiece A and the second workpiece B, and the respective second side surface A2 and third side surface B3. As the first workpiece side surface A2 moves toward the workpiece B side surface B3, the spacer 75 is trapped between these side surfaces, and becomes pinched or clamped between the side surfaces. The placement of the spacer between the side surfaces of the first workpiece A and the second workpiece B in turn sets, establishes or otherwise produces a gap G1 defined between the first workpiece and the second workpiece and their respective side surfaces.

The force F2 may be continued to be applied via the pusher block 65 against the first workpiece A. The user can install a fastener F in the bore 60B of the first guide 60. The user can advance the fastener F along the bore axis 60A, through the guide 60 and into the first side surface A1 of the first workpiece A. The fastener F can be installed through the side surface and into the underlying substrate SS to secure that side of the board to the substrate SS. The user can then install another fastener F into the bore 70B of the second guide 70. That fastener can be advanced along the bore axis 70A with the tool T, which again can be a drill or other rotating tool. This fastener can be advanced through the second side surface A2 of the first workpiece A and can continue into the underlying substrate SS to secure that side of the first workpiece A to the substrate SS. This operation can be performed all while the spacer 75 continues to set the gap G1 between the first workpiece A and the second workpiece B.

The above operation of placing the spacer 75 between the side surfaces of the adjacent first and second workpieces A and B can be continued along the length of the board. Multiple fasteners can be first installed along and through the first side surface A1. Corresponding fasteners can be installed through the second side surface A2 of the first workpiece A to secure the first workpiece A to the substrate or joist SS along the length of the board. This may be repeated multiple times, depending on how many substrates or joists SS are disposed below the respective workpieces.

Figure 9:
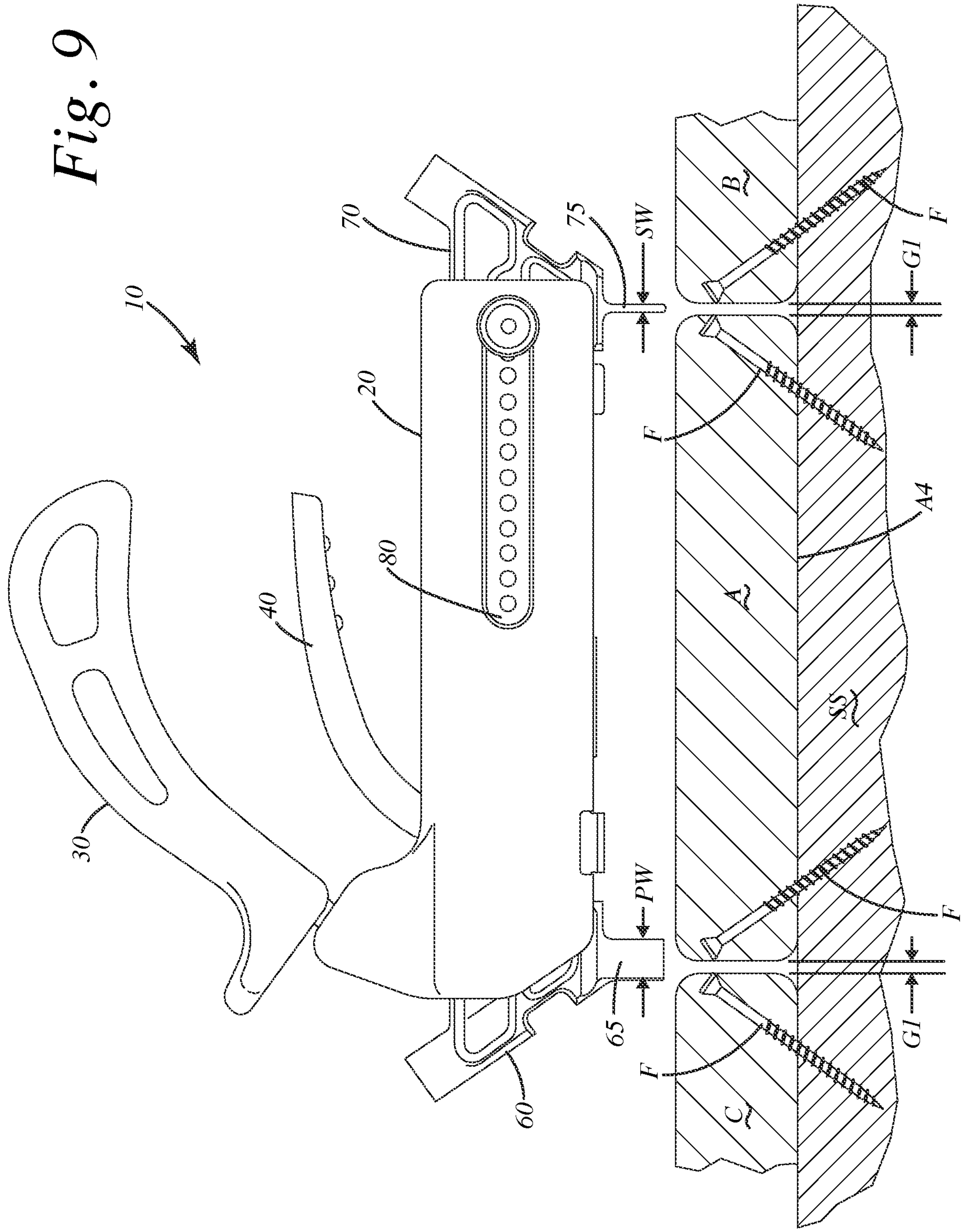
FIG. 9 is a side view of the tool presented over workpieces installed with gaps of the spacer width, illustrating how the pusher block with its pusher block width is incapable of establishing or entering the gaps having the spacer width.

Again, the pusher block 65 of the tool 10 can include a pusher block width PW that is greater than the spacer width SW. As shown in FIG. 9, after multiple workpieces A, B and C are secured to the underlying substrate or joist SS with respective fasteners F, the pusher block 65 is incapable of entering or setting the gap G1 between the respective workpieces equal to the spacer width after the fasteners have been installed, or the workpieces have been secured to the underlying substrate SS. While the spacer 75 shown there of the spacer width FW can enter the gap G1, the pusher block 65 with its pusher block width PW cannot enter that same gap G1.

The spacer 75 can project downwardly or generally protrude into a space that is between the side surfaces A2 and B3 of the respective workpieces. The spacer can set the first gap G1. If other types of spacers or indexing elements are desired, they can be included and extend downwardly from the lower surface of the frame 20. The spacer width SW of the spacer 75, between the forward face 75F and rear face 75R, can be of a dimension or width, optionally about ⅛ inch, about 3/16 inch, about ¼ inch, about 7/16 inch, about ½ inch, about 3/16 to about ½ inch, 1/16 inch or 13/32 inch or other widths, to effectively set the preselected spacing or gap G1 between a first workpiece A and a second workpiece B as shown in FIG. 8. The pusher block 65, on the other hand, cannot set this particular gap nor fit within such a gap G1 produced or set by the spacer 75, because it is of a wider or greater width PW.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an article, element or assembly of one or more elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A fastener installation tool comprising:

a frame including a first end and a second end;

a stationary handle joined with the frame and adapted to be grasped by a user, the stationary handle projecting from the first end in a cantilevered manner;

a moveable handle joined with the frame and moveable relative to the stationary handle, the moveable handle projecting from the first end in a cantilevered manner and distal from the stationary handle;

a first guide joined with the frame adjacent the first end, the first guide defining a first angled bore, the first angled bore including a first axis, a first opening adapted to enable a fastener to enter the first angled bore and a second opening adapted to enable the fastener to exit the first angled bore, the first and second openings aligned along the first axis which is adapted to be disposed at a non-orthogonal angle relative to a first side surface of a first workpiece;

a pusher block joined with the first guide, the pusher block projecting downwardly from the first guide a first distance, the pusher block including a pusher block width extending from a first forward face to a first rearward face of the pusher block;

a second guide joined with the frame adjacent the second end in a selectively adjustable manner, the second guide defining a second angled bore, the second angled bore including a second axis that is transverse to the first axis of the first guide, a first opening adapted to enable another fastener to enter the second angled bore and a second opening adapted to enable the other fastener to exit the second angled bore, the first and second openings of the second axis aligned along the second axis which is adapted to be disposed at a non-orthogonal angle relative to a second side surface of the first workpiece, opposite the first side surface;

a spacer joined with the second guide, the spacer projecting downwardly from the second guide a second distance, the spacer including a spacer width extending from a second forward face to a second rearward face, the spacer width of the spacer being less than the pusher block width of the pusher block, wherein the spacer faces toward the first side surface of the first workpiece such that the spacer width establishes and sets a gap width of a first gap, the gap width substantially equal to the spacer width, between the second side surface of the first workpiece and a third side surface of a second workpiece when the first workpiece is fastened to an underlying substrate, wherein the pusher block faces toward the first side surface of the first workpiece and projects away from the first side surface of the first workpiece by the pusher block width, wherein the pusher block width is incapable of establishing and setting a second gap adjacent the second side surface of the second workpiece that is a same gap width as the first gap after the first and second workpieces are fastened to a substrate because the pusher block width is greater than the spacer width.

2. The tool of claim 1, wherein the first guide and the pusher block are operably joined with the moveable handle, wherein the moveable handle is moveable in a first direction relative to the stationary handle to move the pusher block away from the spacer in an open mode, whereby a workpiece opening sized to receive the first workpiece is established between the pusher block and the spacer in the open mode.

3. The tool of claim 2, wherein the moveable handle is moveable in a second direction relative to the stationary handle to move the pusher block toward the spacer in a clamp mode to clamp the first workpiece therebetween, whereby the first angled bore and the second angled bore are each held in a respective preselected orientation relative to the first workpiece in the clamp mode.

4. The tool of claim 1, wherein the frame includes a first rail, wherein the second guide includes a first slot, wherein the first rail is slidable relative to the first slot.

5. The tool of claim 4, wherein the frame includes a second rail, opposite the first rail to define a lower channel therebetween, wherein the second guide includes a second slot, wherein the second rail is slidable relative to the second slot.

6. The tool of claim 1, wherein the frame includes a guide tube having an upper channel, wherein the second guide is disposed at least partially in the guide tube, wherein the second guide includes a fastener tube extending upward from the second guide and defining at least a portion of the second guide bore, wherein the fastener tube is selectively moveable within the upper channel when the second guide is moved relative to the guide tube.

7. The tool of claim 1, wherein the frame includes a guide tube having first and second walls, wherein the second guide is disposed at least partially in the guide tube between the first and second walls, wherein a fastener projects through the guide tube and the second guide to apply a clamping force and clamp the second guide between the first and second walls in a capture mode.

8. A fastener installation tool comprising:

a frame including a first end and a second end;

a first guide joined with the frame adjacent the first end, the first guide defining a first angled bore, the first angled bore including a first axis adapted to be disposed at a non-orthogonal angle relative to a first side surface of a first workpiece;

a pusher block joined with the first guide, the pusher block projecting downwardly from the first guide a first distance, the pusher block including a pusher block width extending from a first forward face to a first rearward face;

a second guide joined with the frame adjacent the second end in a selectively removeable manner, the second guide defining a second angled bore, the second angled bore including a second axis that is transverse to the first axis of the first guide, and adapted to be disposed at a non-orthogonal angle relative to a second side surface of the first workpiece, opposite the first side surface;

a spacer joined with the second guide, the spacer projecting downwardly from the second guide a second distance, the spacer including a spacer width extending from a second forward face to a second rearward face, the spacer width being less than the pusher block width; and a handle joined with the frame and moveable to actuate at least one of the pusher block and the spacer to clamp the first workpiece therebetween in a clamp mode, wherein the pusher block and the spacer are incapable of setting a commonly dimensioned gap between the first workpiece and an adjacent workpiece due to the spacer width being less than the pusher block width.

9. A method of installing a fastener with a tool, the method comprising:

providing a first workpiece including an upper surface, a lower surface opposite the upper surface and substantially parallel to the upper surface, and first and second side surfaces joined with the upper surface and the lower surface, the first and second side surfaces being substantially perpendicular to the upper and lower surfaces, the first and second side surfaces being positioned on opposite sides of the first workpiece;

placing the lower surface of the first workpiece adjacent a substrate;

placing the first workpiece adjacent a second workpiece which is disposed adjacent the substrate, the second workpiece having a third side surface and a fourth side surface, so that the second side surface is near the third side surface;

providing a tool including a spacer that extends downwardly, a first guide defining an angled bore extending along an axis adapted to be placed at a non-orthogonal angle relative to a first side surface of the first workpiece, the angled bore adapted to guide a fastener from the angled bore immediately adjacent the first side surface of the first workpiece, the tool including a pusher block that extends downwardly distal from the spacer;

placing the pusher block adjacent the first side surface;

clamping the first workpiece between the pusher block and the spacer;

urging the first workpiece toward the second workpiece with the pusher block, with the spacer located between the second side surface and the third side surface so that the spacer sets a first gap between the first workpiece and the second workpiece equal to a spacer width of the spacer; and advancing the fastener within the angled bore so that the fastener enters the first side surface and advances at least partially through the first workpiece and into the substrate to join the first workpiece to the substrate adjacent the second workpiece, wherein the pusher block is of a pusher block width that is greater than the spacer width so that the pusher block is incapable of setting the first gap between the first workpiece and the second workpiece equal to the spacer width after said advancing step.

10. The method of claim 9 comprising:

installing a plurality of third workpieces in parallel adjacent the first workpiece on the substrate;

setting a plurality of second gaps between each of the third workpieces with only the spacer, not the pusher block, so the second gaps are equal to the spacer width, wherein the pusher block with the pusher block width is too wide to fit within the plurality of second gaps.

11. The method of claim 9, wherein the spacer width is between 1⁄16 inch and 1⁄4 inch, wherein the pusher block width is at least 3⁄16 inch.

12. The method of claim 11 comprising:

advancing the fastener through the first guide and the pusher block; and advancing another fastener through a second guide, distal from the first guide, and through the spacer, within the first gap.

13. The method of claim 11 comprising:

removing an adjustment fastener from a first hole defined by a guide tube and from a second guide of the tool, the second guide located in a first location;

moving the second guide and spacer relative to the pusher block;

installing the adjustment fastener relative to a second hole, distal from the first hole, to secure the second guide in a second location, distal from the first location; and tightening the adjustment fastener to engage the guide tube against the second guide and clamp the second guide in the second location in a capture mode.

14. The method of claim 13 comprising:

engaging a first guide tube sidewall against a first side of the second guide; and engaging a second guide tube sidewall against a second side of the second guide to clamp the second guide in the second location in the capture mode.

15. The method of claim 11 comprising:

moving the second guide distal from the first guide in a guide tube so that a fastener tube extending from the second guide and defining at least a portion of the angled bore moves within a channel defined by the guide tube.

16. A method of installing a fastener with a tool, the method comprising:

placing a first workpiece adjacent a second workpiece and over a substrate;

providing a tool including a spacer that extends downwardly, a first guide defining an angled bore extending along an axis adapted to be placed at a non-orthogonal angle relative to a first side surface of the first workpiece, the angled bore adapted to guide a fastener from the angled bore immediately adjacent the first side surface of the first workpiece, the tool including a pusher block that extends downwardly distal from the spacer, the pusher block including a pusher block width;

urging the first workpiece toward the second workpiece with the pusher block, with the spacer located between the first workpiece and the second workpiece so as to set a gap between the first workpiece and the second workpiece equal to a spacer width of the spacer, but not the pusher block width;

advancing the fastener along the axis of the angled bore so that the fastener enters the first side surface and advances at least partially through the first workpiece and into the substrate to join the first workpiece to the substrate adjacent the second workpiece, wherein the pusher block width is greater than the spacer width so that the pusher block is incapable of setting the gap or fitting into the gap between the first workpiece and the second workpiece equal to the spacer width after said advancing step.

17. The method of claim 16, wherein the spacer is joined with the first guide, wherein a second guide defines another angled bore extending along another axis adapted to be placed at a non-orthogonal angle relative to a second side surface of the first workpiece, the other angled bore adapted to guide another fastener from the other angled bore immediately adjacent the second side surface of the first workpiece.

18. The method of claim 17 comprising:

clamping the first workpiece between the pusher block and the spacer.

19. The method of claim 18 comprising:

sliding the second guide relative to a guide tube so that a fastener tube moves within an upper channel defined by the guide tube.

20. The method of claim 19 comprising:

clamping the second guide between a first sidewall and a second sidewall of the guide tube with an adjustment fastener so that the second guide is immovable within the guide tube, wherein the first sidewall is clamped with a clamping force directly against the second guide, wherein the second sidewall is clamped with the clamping force directly against the second guide.

* * * * *